United States Patent
Huber et al.

(10) Patent No.: US 10,631,214 B2
(45) Date of Patent: Apr. 21, 2020

(54) METHODS AND DEVICES FOR PERFORMING A MOBILE NETWORK SWITCH

(71) Applicant: GIESECKE & DEVRIENT GMBH, München (DE)

(72) Inventors: Ulrich Huber, München (DE); Thomas Larsson, Älvsjö (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 67 days.

(21) Appl. No.: 14/911,001

(22) PCT Filed: Aug. 8, 2014

(86) PCT No.: PCT/EP2014/002191
§ 371 (c)(1),
(2) Date: Feb. 8, 2016

(87) PCT Pub. No.: WO2015/018533
PCT Pub. Date: Feb. 12, 2015

(65) Prior Publication Data
US 2016/0198378 A1    Jul. 7, 2016

(30) Foreign Application Priority Data
Aug. 9, 2013 (EP) .................... 13003979

(51) Int. Cl.
*H04W 36/14* (2009.01)
*H04W 8/26* (2009.01)
(Continued)

(52) U.S. Cl.
CPC .......... *H04W 36/14* (2013.01); *H04L 67/306* (2013.01); *H04W 4/14* (2013.01); *H04W 8/265* (2013.01)

(58) Field of Classification Search
CPC ....... H04W 36/14; H04W 4/14; H04W 8/265; H04L 67/306
See application file for complete search history.

(56) References Cited

U.S. PATENT DOCUMENTS 5,214,652 A * 5/1993 Sutton ................. G06F 11/2038
714/10
5,390,252 A * 2/1995 Suzuki ................. H04L 9/0822
380/247
(Continued)

FOREIGN PATENT DOCUMENTS

DE    102010009257 A1    8/2011
EP    2469897 A1    6/2012
(Continued)

OTHER PUBLICATIONS

CSMG, "Reprogrammable SIMs: Technology, Evolution and Implications," URL: http://stakeholders.ofcom.org.uk/binaries/research/telecoms-research/reprogrammable-sims.pdf, Sep. 25, 2012, pp. 1-95.
(Continued)

*Primary Examiner* — Christine Ng
(74) *Attorney, Agent, or Firm* — Workman Nydegger

(57) ABSTRACT

A method for performing a switch from a first mobile network to a second mobile network by a mobile terminal comprising a secure element includes the following steps: attaching to the first mobile network using a first subscription profile; downloading a second subscription profile from a subscription management server including a command script defining a sequence of commands; attaching to the second mobile network; and executing the sequence of commands defined by the command script.

16 Claims, 2 Drawing Sheets

(51) Int. Cl.
*H04L 29/08* (2006.01)
*H04W 4/14* (2009.01)

(56) References Cited

U.S. PATENT DOCUMENTS

| | | | |
|---|---|---|---|
| 8,918,143 B2 | 12/2014 | Jacobs et al. | |
| 2005/0182802 A1* | 8/2005 | Beaudou | H04L 63/20 |
| | | | 708/200 |
| 2006/0035631 A1* | 2/2006 | White | H04M 3/382 |
| | | | 455/418 |
| 2007/0254711 A1 | 11/2007 | Young et al. | |
| 2010/0136967 A1* | 6/2010 | Du | H04W 8/205 |
| | | | 455/432.3 |
| 2011/0093919 A1* | 4/2011 | Naslund | H04L 63/20 |
| | | | 726/3 |
| 2011/0207503 A1* | 8/2011 | Ruperto | H04W 48/18 |
| | | | 455/552.1 |
| 2012/0028289 A1 | 2/2012 | Sirois et al. | |
| 2012/0329522 A1 | 12/2012 | Jacobs et al. | |
| 2013/0283047 A1* | 10/2013 | Merrien | H04W 12/08 |
| | | | 713/164 |
| 2014/0004854 A1* | 1/2014 | Veran | H04W 48/18 |
| | | | 455/432.1 |
| 2014/0227996 A1* | 8/2014 | Tuilier | H04W 48/18 |
| | | | 455/406 |

FOREIGN PATENT DOCUMENTS

| | | |
|---|---|---|
| EP | 2528363 A2 | 11/2012 |
| WO | 2012085593 A1 | 6/2012 |

OTHER PUBLICATIONS

Extended European Search Report for corresponding European Application No. 13003979.5, dated Jan. 17, 2014.
International Search Report for corresponding International PCT Application No. PCT/EP2014/002191, dated Jan. 20, 2015.
"Embedded SIM Task Force Requirements and Use Cases", GSM Association, Feb. 21, 2011, 38 pages.

* cited by examiner

METHODS AND DEVICES FOR PERFORMING A MOBILE NETWORK SWITCH

FIELD OF THE INVENTION

The invention relates to mobile communications in general and in particular to methods and devices for performing a switch from a first subscription profile for attaching to a first mobile network to a second subscription profile for attaching to a second mobile network by a mobile terminal comprising a secure element, such as a subscriber identity module (SIM), an eUICC/UICC or the like.

BACKGROUND OF THE INVENTION

Communicating by means of a mobile terminal, such as a mobile phone, via a public land mobile network (PLMN; also referred to as a mobile or cellular communications network herein) operated by a mobile network operator (MNO) generally requires the mobile terminal to be equipped with a secure element for securely storing data uniquely identifying the user of the mobile terminal (also called subscriber). For instance, in the context of a mobile terminal configured to communicate according to the Global System for Mobile Communications (GSM), currently the world's most popular standard for mobile communications systems, the secure element is called a subscriber identity module (SIM) and is usually provided in the form of a smart card. According to the GSM standard, the technical features of which are defined by a large number of interrelated and mutually dependent specifications published by the ETSI standardization organization, the SIM contains subscription credentials for authenticating and identifying the user of the mobile terminal, including in particular an International Mobile Subscriber Identity (IMSI) and an authentication key $K_i$. These subscription credentials are generally stored on the SIM as part of a subscription profile by the SIM manufacturer/vendor or the MNO during a SIM personalization process prior to providing the user of the mobile terminal with his SIM. A non-personalized SIM is generally not suited for use in a mobile terminal, i.e. using the services provided by a PLMN with a non-personalized SIM without a subscription profile is not possible.

One particular field of application of secure elements, such as SIMs, eUICCs, UICCs and the like, which is expected to grow rapidly in the future is M2M (machine-to-machine) communication, i.e. the communication between machines over a cellular communications network without human intervention, also called the Internet of things. In M2M communication data is automatically transmitted between many different types of machines equipped with a secure element in the form of a M2M module, such as TV systems, set top boxes, vending machines, vehicles, traffic lights, surveillance cameras, sensor devices, and the like. It is foreseeable that at least for some of these devices it will not be possible or at least very difficult to provide the secure element beforehand with a subscription profile, including for instance an IMSI. This is because in a lot of M2M devices the secure element will most likely be implemented in the form of a surface mounted chip or chip module without the possibility of providing the secure element with a subscription profile beforehand. Consequently, once in the field, these M2M devices and their non-personalized secure elements generally require the provision of a subscription profile over-the-air.

When using the services provided by a MNO, in particular communicating via the PLMN provided by the MNO, the user of a mobile terminal is usually charged a certain monthly fee by the MNO. If the mobile user wants, for instance due to a lower monthly charge and/or superior services, to change to a different MNO, he generally has to manually replace the SIM provided by the current MNO and containing the subscription profile necessary for attaching to the PLMN of the current MNO by the SIM provided by the new MNO and containing the subscription profile necessary for attaching to the PLMN of the new MNO. Certainly, it would be easier for the user, if instead of this conventional process of switching to a new MNO by manually replacing the SIM it would be possible to use one and the same secure element in the form of a SIM that can be "reprogrammed" over-the-air.

Conventional methods are known for downloading a target subscription profile over-the-air onto a secure element with an already existing subscription profile and performing a switch from the already existing subscription profile to the target subscription profile associated with a target mobile network. Moreover, it is known to confirm the successful finalization and switch to the target mobile network by sending SMS, USSD and/or BIP messages from the mobile terminal to a subscription management backend system. However, in some case these communication means for finalizing and confirming a mobile network switch are not available at all, for instance, because SMS messages cannot be used on the target mobile network due to no credit yet, or should be reduced to a minimum for cost reasons. There is, therefore, a need for improved methods and devices for performing a switch from a first mobile network to a second mobile network by a mobile terminal comprising a secure element, such as a subscriber identity module (SIM), an eUICC/UICC or the like, and, in particular, for improved methods and devices for confirming the successful finalization of such a switch to a subscription management backend system.

SUMMARY OF THE INVENTION

The above object is achieved according to the present invention by the subject-matter of the independent claims. Preferred embodiments of the invention are defined in the dependent claims.

According to a first aspect the invention provides for a method for performing a switch from a first mobile network to a second mobile network by a mobile terminal comprising a secure element. The method comprises the following steps: attaching to the first mobile network using a first subscription profile; downloading a second subscription profile from a subscription management server; downloading a command script defining a sequence of commands from the subscription management server; attaching to the second mobile network using the second subscription profile; and executing the sequence of commands defined by the command script.

According to preferred embodiments of the invention, the command script is downloaded as part of the second subscription profile.

Preferably the step of downloading the command script comprises the additional step of checking the integrity of the command script.

According to preferred embodiments of the invention, the step of checking the integrity of the command script comprises the additional step of sending a confirmation message to the subscription management server confirming that the command script received from the subscription management server is integer. Preferably the confirmation message is a SMS message.

Preferably the step of executing the sequence of commands comprises the additional step of sending a confirmation message to the subscription management server confirming that the sequence of commands defined by the command script has been executed successfully. Preferably the confirmation message is a SMS message.

According to preferred embodiments of the invention, the receipt of the confirmation message by the subscription management server triggers the additional step of instructing the secure element to switch to the second subscription profile and to attach to the second mobile network.

Preferably the method comprises the additional step of repeating the execution of the sequence of commands defined by the command script from the beginning or returning to the first subscription profile, in case the sequence of commands defined by the command script was not executed successfully.

According to preferred embodiments of the invention, the method includes the additional step of informing the second mobile network about the download of the second subscription profile by the secure element and providing the second mobile network with the subscription credentials of the second subscription profile for the second mobile network to be able to allow the secure element to attach to the second mobile network using the second subscription profile.

Preferably the step of downloading the second subscription profile comprises the additional step of storing the command script in a memory of the secure element such that the secure element has access thereto, once the secure element has attached to the second mobile network using the second subscription profile.

According to preferred embodiments of the invention, the first mobile network and/or the second mobile network are operated according to the GSM standard.

Preferably the first subscription profile is a provisional subscription profile that is stored on the secure element during the manufacturing and/or personalization process of the mobile terminal and/or the secure element.

According to a second aspect the invention provides for a secure element configured to perform the steps of the method according to the first aspect of the invention.

Preferably, the secure element is a subscriber identity module (SIM) for authentication/identification of a subscriber in the mobile network. Such a SIM communicates with the mobile terminal via a card reader therein and can be removed in principle from the mobile terminal to be either replaced by a different SIM and/or used in a different mobile terminal. Alternatively, the secure element is an integral part of the mobile terminal such as a hard-wired chip module. Such embedded secure elements are known, for instance, as embedded Universal Integrated Circuit Cards (eUICCs). Preferably, the secure element supports storage of multiple subscription profiles which may be associated with different MNOs. Generally, only one subscription profile is active at a time.

According to a third aspect the invention provides for a mobile terminal containing a secure element according to the second aspect of the invention.

The mobile terminal according to the present invention comprises means for communicating with a cellular communications network, in order to receive a new subscription profile. Preferably, the mobile terminal is implemented in form of a smart phone, a tablet PC, a notebook, a PDA, or the like. Alternatively the mobile terminal can be a multimedia device such as digital picture frame, audio equipment, a TV system, a set top box, an e-book reader and so on. By way of example, the term "mobile terminal" also includes any kind of machinery, like vending machines, vehicles, smart-meters and the like that are configured to communicate via a cellular communications system in the context of a M2M system.

According to a fourth aspect the invention provides for a subscription management server configured to interact with the secure element according to the second aspect of the invention according to the method according to the first aspect of the invention.

These and other features, characteristics, advantages, and objects of the invention will be clear from the following detailed description of preferred embodiments, given as a non-restrictive example, under reference to the attached drawings. The person skilled in the art will appreciate, in particular, that the above preferred embodiments can be combined in several ways, which will result in additional advantageous embodiments that are explicitly supported and covered by the present invention. In particular, the person skilled in the art will appreciate that the above described preferred embodiments can be implemented in the context of the different aspects of the invention.

DETAILED DESCRIPTION OF PREFERRED EMBODIMENTS

Figure 1:
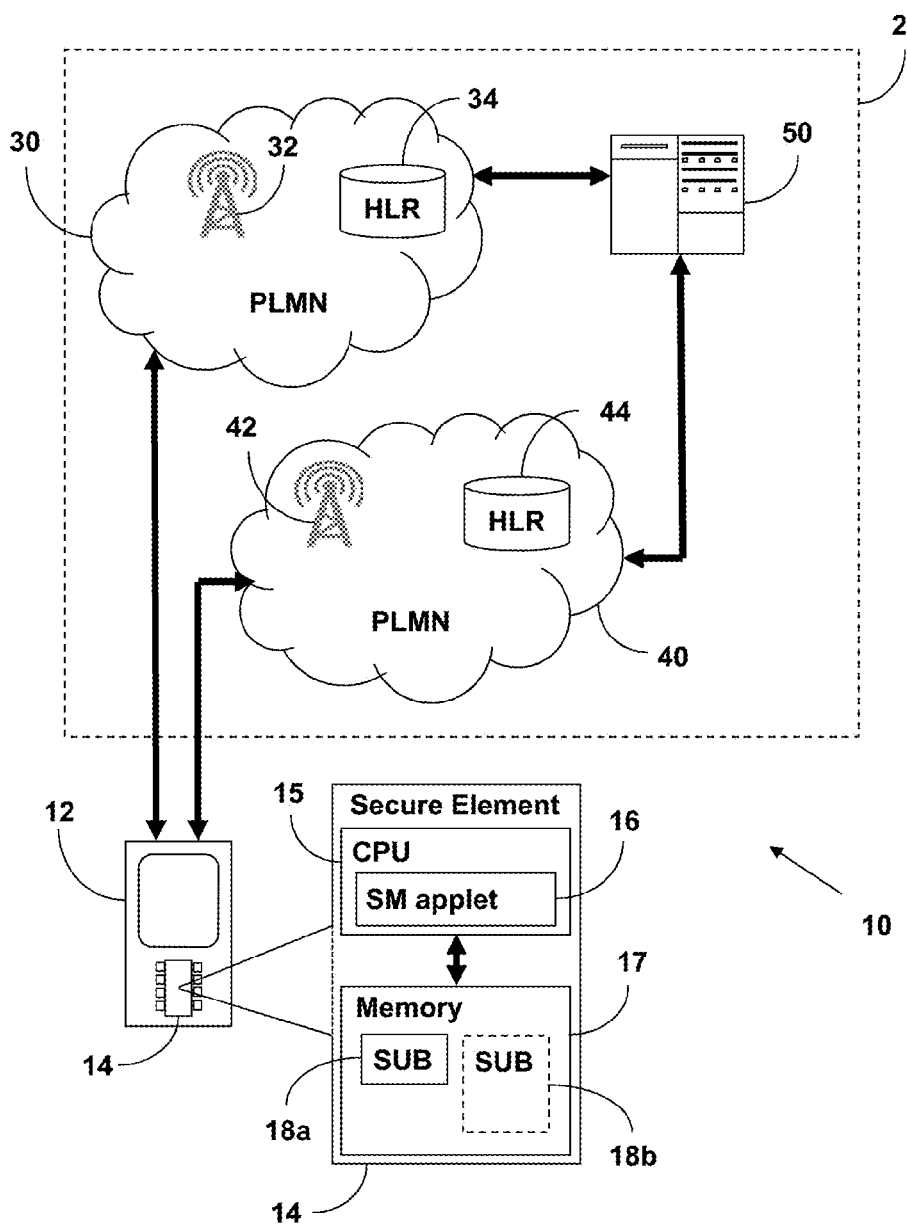
FIG. 1 shows a schematic overview of a mobile communications system illustrating different aspects of the present invention.

FIG. 1 shows schematically the components of a communications system 10 as well as some of the communication channels or links between the components of this system 10 that illustrate different aspects of the present invention. Although the below detailed description will refer to a "mobile" terminal, the person skilled in the art will appreciate that the present invention can be advantageously implemented in the context of any kind of terminal that is configured to communicate via a mobile or cellular communications network. In other words, the attribute "mobile" used herein refers to the ability of a terminal to communicate via a mobile or cellular communications network (or short mobile network), also including IP based mobile communication networks.

An exemplary mobile terminal 12 is shown in FIG. 1 including a secure element 14 for securely storing and processing data that uniquely identifies the mobile terminal 12 and/or its user, i.e. the subscriber. As indicated in FIG. 1, the mobile terminal 12 preferably is a mobile phone, smart phone or a similar device. The person skilled in the art will appreciate, however, that the mobile terminal 12 according to the present invention can be implemented in the form of other devices as well, such as a tablet or notebook computer, a TV system, a set top box, a vending machine, a vehicle, a surveillance camera, a sensor device and the like.

According to preferred embodiments of the invention the secure element 14 is configured as an eUICC or UICC with a SIM application running thereon, i.e. a secure element that can be mounted in the mobile terminal 12 and used in cellular communications systems for unique and secure subscriber identification as well as for the provision of different special functions and value-added services. Alternatively, the secure element 14 could be configured as a removable subscriber identity module (SIM), the SIM currently being the most popular type of secure element. The person skilled in the art will appreciate, however, that other types of secure elements that, depending on the underlying generation and type of cellular communications system standard, are designated as USIM, R-UIM, ISIM and the like, are also encompassed by the present invention. Moreover, the secure element 14 could be a M2M module or a Trusted Execution Environment (TEE) implemented as part of the mobile terminal 12.

The mobile terminal 12 is configured to communicate via the air interface (or radio link) with a first cellular communications network or public land mobile network (PLMN) 30 or a second cellular communications network or public land mobile network (PLMN) 40 of a mobile communications system 20. Preferably, the first PLMN 30 (also referred to herein as the provisioning PLMN 30) is operated by a first mobile network operator (MNO) and the second PLMN 40 (also referred to herein as the target PLMN 30) is operated by a second mobile network operator (MNO). Preferably, the provisioning PLMN 30 and the target PLMN 40 can be accessed from substantially the same physical location. According to preferred embodiments the provisioning PLMN 30 and/or the target PLMN 40 are operated according to the GSM standard.

In the following, preferred embodiments of the invention will be described in the context of mobile or cellular communications networks according to the standards of the Global System for Mobile communication (GSM), as specified in a number of specifications provided by ETSI. However, the person skilled in the art will appreciate that the present invention may be advantageously applied in connection with other cellular communications systems as well. Such systems include third-generation cellular communications systems (3GPP), such as the Universal Mobile Telecommunications System (UMTS), and next generation or fourth-generation mobile networks (4G), such as Long Term Evolution (LTE), as well as other cellular communications systems.

As is well known to the person skilled in the art, a PLMN configured according to the GSM standard generally comprises a base station subsystem consisting of one or more base transceiver stations that define respective cells of the PLMN and are connected to a base station controller. Generally, the base station controller is one of several base station controllers that communicate with a common mobile switching center (MSC). Often, a local database called Visitor Location Register (VLR) for keeping track of the mobile users currently located within the cells covered by a MSC (i.e. the MSC service area) is incorporated in the MSC. The MSC provides essentially the same functionality as a central office switch in a public-switched telephone network and is additionally responsible for call processing, mobility management, and radio resource management. The MSC is further in communication with a home location register (HLR), which is the primary database of the PLMN that stores information about its mobile users required for authentication. To this end, the HLR generally is in communication with an authentication center (AUC). The person skilled in the art will appreciate that although the above described components of a conventional GSM system may have different names in different or consecutive standards for mobile communications networks, the underlying principles used therein are substantially similar and, therefore, compatible with the present invention.

As is known to the person skilled in the art, the communication means between the above described components of a PLMN may be proprietary or may use open standards. The protocols may be SS7 or IP-based. SS7 is a global standard for telecommunications defined by the International Telecommunication Union (ITU) Telecommunication Standardization Sector (ITU-T). The standard defines the procedures and the protocols by which network elements in the public switched telephone network (PSTN) exchange information over a digital signaling network to effect wireless (cellular) and wired call setup, routing and control. The SS7 network and protocol are used for e.g. basic call setup, management, wireless services, wireless roaming, and mobile subscriber authentication, i.e. enhanced call features providing for efficient and secure worldwide telecommunications. How the network elements are grouped or left separate and the interfaces—whether proprietary or open—between these elements are left to the MNO.

Of the above described components of a PLMN only the following ones are shown in the schematic drawing of FIG. 1 for ease of explanation: an exemplary base transceiver station 32 and a HLR 34 for the provisioning PLMN 30 and an exemplary base transceiver station 42 and a HLR 44 for the target PLMN 40. The provisioning PLMN 30 and the target PLMN 40 are each at least in temporary communication with a subscription management server 50, as will be described in more detail further below. The provisioning PLMN 30 and/or the target PLMN 40 moreover could each comprise a SMS-C (Short Message Service Center) for storing, forwarding, converting and delivering SMS messages or be connected to a common SMS-C.

As can be taken from the enlarged view of the secure element 14 in FIG. 1, the secure element 14 preferably comprises a central processing unit (CPU) 15. Preferably, the CPU 15 is configured such that at least one subscription management application 16 (SM applet) can be executed on the CPU 15 providing for some of the features that will be described in the context of FIG. 2 in more detail further below. The subscription management application 16 could be implemented, for instance, as a Java Applet. For providing an execution environment for the subscription management application 16 a secure element operating system (not shown in FIG. 1) is preferably implemented on the CPU 15.

Moreover, the secure element 14 preferably comprises a memory unit 17, which preferably is implemented as a non-volatile, rewritable memory unity, e.g., a flash memory. As can be taken from FIG. 1, a first subscription profile (SUB) 18a is stored in the memory unit 17 of the secure element 14. This first subscription profile 18a comprises data that allow the secure element 14 and the mobile terminal 12 to attach to the provisioning PLMN 30, i.e. data, such as subscription credentials, a MNO specific authentication algorithm, and the like. Preferably, at least parts of the memory unit 17 of the secure element 14 are configured to securely store the data therein, for instance any subscription credentials to be kept secret, such as an International Mobile Subscriber Identity (IMSI) and/or an authentication key $K_i$, that are part of the first subscription profile 18a. As indicated in FIG. 1, the memory unit 17 preferably provides several "slots" for accommodating additional subscription profiles, such as a second subscription profile (SUB) 18b, which is preferably provided by the subscription management server 50 according to the process shown in FIG. 2 and described in more detail further below.

Preferably, the first subscription profile 18a is stored in the memory unit 17 of the secure element 14 during the manufacturing and/or personalization process of the mobile terminal 12 and/or its secure element 14. Especially in the context of this preferred embodiment it is conceivable that the first subscription profile 18a is merely a provisional subscription profile only providing for basic services that allow the secure element 14 and mobile terminal 12 to communicate with the subscription management server 50 via the provisioning PLMN 30 and to download a more complete subscription profile providing for additional services, such as the second subscription profile 18b shown in FIG. 1. As a provisional subscription profile, such as the first subscription profile 18a shown in FIG. 1, generally provides only a limited functionality, the user of the mobile terminal 12 generally will be enticed to change to a more complete subscription profile providing for additional services, such as the second subscription profile 18b shown in FIG. 1.

The operation of the SM server 50 in combination with the other elements of the communications system 10 shown in FIG. 1 will now be described in the context of a preferred embodiment of the invention under further reference to FIG. 2 for the case where in the beginning only the provisional subscription profile 18a is present on the secure element 14. From the following detailed description the person skilled in the art will appreciate, however, that the present invention can be also advantageously used in the case where in addition to the provisional subscription profile 18a also the target subscription profile 18b (and possibly other subscription profiles) is already present on the secure element 14.

Figure 2:
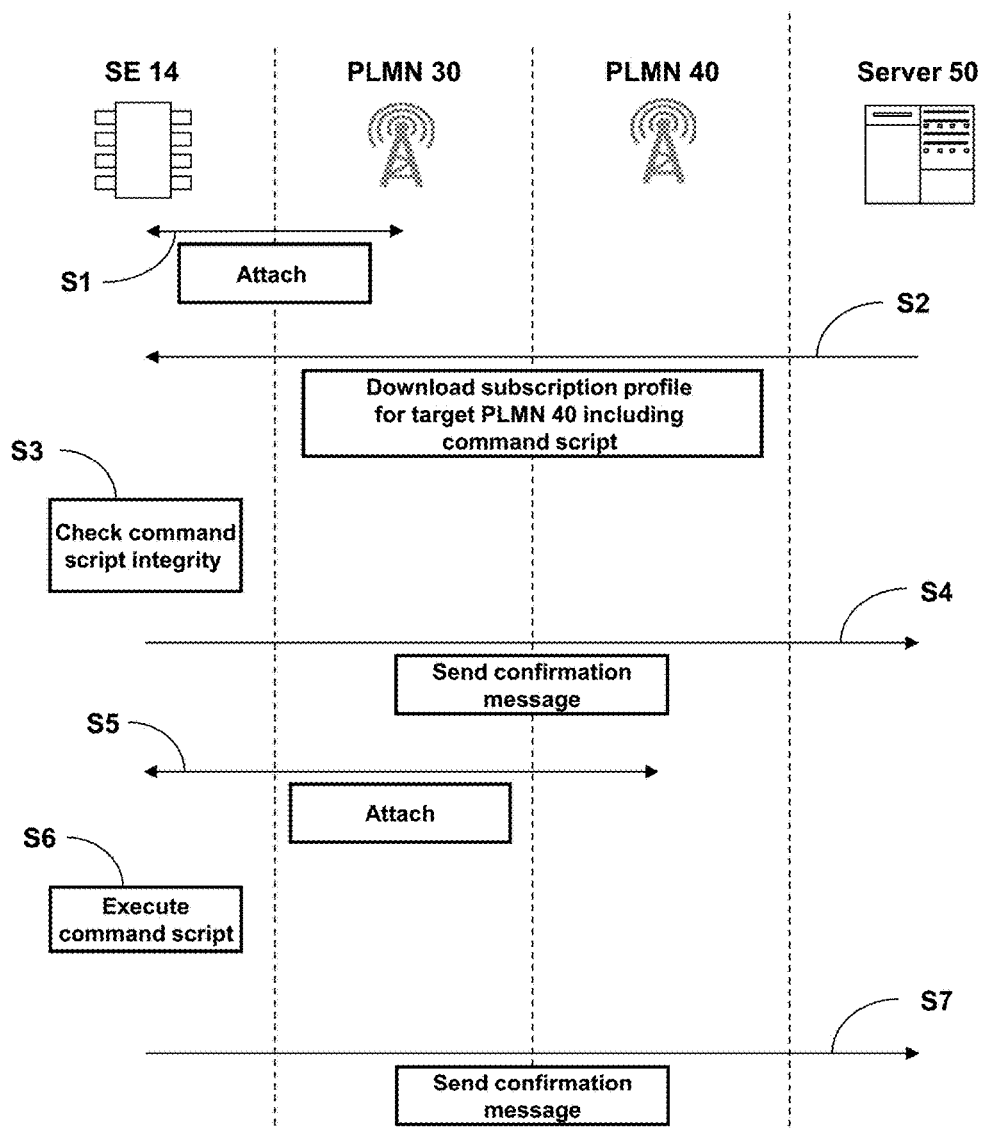
FIG. 2 shows a diagram illustrating a method for performing a mobile network switch from a first mobile network to a second mobile network of the mobile communications system of FIG. 1 according to a preferred embodiment of the invention.

In step S1 of FIG. 2 the secure element 14 attaches to the provisioning PLMN 30 using its provisional subscription profile 18a. Preferably, this attachment is done according to the conventional GSM challenge response authentication procedure well known to the person skilled in the art. Having successfully attached to the provisioning PLMN 30 the secure element 14 in step S2 of FIG. 2 downloads the target subscription profile 18b from the SM server 50 for attaching to the target PLMN 40 and utilizing the services provided thereby.

Preferably as part of downloading the target subscription profile 18b, the SM server 50 provides the secure element 14 in step S2 of FIG. 2 with a command script, i.e. a sequence or list of commands, to be executed by the secure element 14 after the secure element 14 has successfully attached to the target PLMN 40 using the target subscription profile 18b. The person skilled in the art will appreciate, however, that the SM server 50 could provide the secure element 14 with the command script in a separate step, i.e. the command script could be downloaded from the SM server 50 in a separate step. The command script could include commands for erasing the provisional subscription profile 18a in the non-volatile memory 17 of the secure element 14, unlocking applications implemented on the secure element 14 and/or the mobile terminal 12, unlocking a PIN number and the like. Preferably, the command script provided by the SM server in step 2 of FIG. 2 is stored in a part of the memory 17 such that the SM applet 16 has access thereto, once the provisional subscription profile 18a is no longer active and the target subscription profile 18b has become the active subscription profile.

In step S3 of FIG. 2 the secure element 14, preferably by means of the SM applet 16, checks that the command script it has received in step S2 of FIG. 2 is complete and has not been tampered with, for instance, by calculating a checksum thereof. This checksum could also include the target subscription profile 18b downloaded along with the command script in step S2 of FIG. 2. In case the checksum computed by the secure element 14 is not equal to a reference checksum provided by the SM server 50 in step S2 of FIG. 2, the secure element 14 could request the SM server 50 to repeat step S2 of FIG. 2. The person skilled in the art is aware of many different available means to check the integrity of the data transmitted from the SM server 50 to the secure element in step S2 of FIG. 2, such as hash functions and message authentication codes, and/or, if necessary, to protect this data by encryption, so that these means will not be described in greater detail herein.

Having checked the integrity of the command script in step S3 of FIG. 2, the secure element 14 preferably sends a confirmation message in step S4 of FIG. 2 to the SM server 50 confirming that the integrity of the command script it has received has not been tampered with, i.e. that the command script is integer. Preferably, the receipt of this confirmation message triggers the SM server 50 to instruct the secure element 14 to switch to the target subscription profile and to attach to the target PLMN 40. Alternatively, the switch to the target subscription profile can be triggered by the secure element 14 itself or a user interaction via the mobile terminal 12. Consequently, in step S5 of FIG. 2 the secure element 14 deactivates the provisional subscription profile 18a, activates the target subscription profile 18b and attaches to the target PLMN 40 using the target subscription profile 18b. This means, as the person skilled in the art will readily appreciate, that any subsequent communication between the secure element 14 and the SM server 50 is no longer via the provisioning PLMN 30, but via the target PLMN 40.

In step S6 of FIG. 2 the secure element 14 executes the commands of the command script provided by the SM server in step S2 of FIG. 2 via the provisioning PLMN 40. As already mentioned above, the command could include commands for removing the provisional subscription profile 18a on the memory unit 17, unlocking certain applications on the secure element 14 or the mobile terminal 12 and the like.

Only after all of the commands of the command script have been successfully executed, the secure element 14 sends a corresponding confirmation message to the SM server 50, preferably in the form of a SMS message. Thus, this confirmation message proves to SM server 50 that the secure element 14 has successfully executed all commands of the command script and the SM server 50 can determine the state of the secure element 14 as well as the different subscription profiles located thereon.

In case of any error before completion of the command script there is preferably a fall-back mechanism, such as repeating the execution of the command script from the beginning, returning to the provisional subscription profile 18a, for instance by deactivating the target subscription profile 18b, activating the provisional subscription profile 18a and attaching to the provisioning PLMN 30.

In light of the above detailed description the person skilled in the art will appreciate that modifications and/or additions can be made to the methods, devices and systems as described heretofore, which are to be considered to remain within the scope of the present invention as defined by the appended claims.

For instance, the downloading of the subscription profile in step S2 of FIG. 2 could trigger the additional step (not shown in FIG. 2) that the SM server 50 informs the target PLMN 40, in particular the HLR 44 thereof, about the download of the target subscription profile 18b by the secure element 14 in order for the target PLMN 40 to perform any additional preparations that might be necessary for allowing the secure element 14 to attach to the target PLMN 40 using the target subscription profile 18b, such as registering the IMSI of the subscription profile in the HLR 44 of the target PLMN 40.

The invention claimed is:

1. A method for performing a switch from a first mobile network to a second mobile network by a mobile terminal comprising a secure element, wherein the method comprises the following steps:
    attaching to the first mobile network using a first subscription profile;
    downloading a second subscription profile from a subscription management server, the second subscription profile including an authentication algorithm for connecting to a specified mobile network operator, wherein downloading the second subscription profile triggers transmission of a notification from a subscription management server to the second mobile network indicating to the second mobile network that one or more preparatory steps are to be taken before the mobile terminal connects to the second mobile network;
    downloading a command script defining a sequence of commands from the subscription management server;
    attaching to the second mobile network using the second subscription profile; and
        executing the sequence of commands defined by the command script,
        wherein in the case that an error occurs while executing the sequence of commands defined by the command script, a fallback mechanism is triggered, the fallback mechanism performing
        deactivating the second subscription profile and reactivating the first subscription profile such that the mobile terminal is able to reattach to the first mobile network.

2. The method of claim 1, wherein the step of downloading the command script comprises an additional step of checking the integrity of the command script.

3. The method of claim 2, wherein the step of checking the integrity of the command script comprises an additional step of sending a confirmation message to the subscription management server confirming that the command script received from the subscription management server is authentic.

4. The method of claim 3, wherein the confirmation message is a SMS message.

5. The method of claim 3, wherein the receipt of the confirmation message by the subscription management server triggers an additional step of instructing the secure element to switch to the second subscription profile and to attach to the second mobile network.

6. The method of claim 1, wherein the step of executing the sequence of commands comprises an additional step of sending a confirmation message to the subscription management server confirming that the sequence of commands defined by the command script has been executed successfully.

7. The method of claim 6, wherein the confirmation message is a SMS message.

8. The method of claim 1, wherein the fall-back mechanism further performs repeating execution of the command script from the beginning.

9. The method of claim 1, wherein the method includes an additional step of informing the second mobile network about the download of the second subscription profile by the secure element and providing the second mobile network with the subscription credentials of the second subscription profile for the second mobile network to be able to allow the secure element to attach to the second mobile network using the second subscription profile.

10. The method of claim 1, wherein the step of downloading the second subscription profile comprises an additional step of storing the command script in a memory of the secure element such that the secure element has access thereto, once the secure element has attached to the second mobile network using the second subscription profile.

11. The method of claim 1, wherein the first mobile network and/or the second mobile network are operated according to the GSM standard, 3GPP, 3G, or LTE.

12. The method of claim 1, wherein the first subscription profile is a provisional subscription profile that is stored on the secure element during the manufacturing and/or personalization process of the mobile terminal and/or the secure element.

13. The method of claim 1, wherein the command script is downloaded as part of the second subscription profile.

14. A secure element configured to perform the steps of the method according to claim 1, wherein the secure element is a removable subscriber identity module (SIM) or an embedded part of the mobile terminal, including an embedded Universal Integrated Circuit Card (eUICC).

15. A mobile terminal containing a secure element according to claim 14.

16. A subscription management server configured to interact with the secure element of claim 14 according to a method for performing a switch from a first mobile network to a second mobile network by a mobile terminal comprising the secure element, wherein the method comprises the following steps:
    attaching to the first mobile network using a first subscription profile;
    downloading a second subscription profile from the subscription management server;
    downloading a command script defining a sequence of commands from the subscription management server;
    attaching to the second mobile network using the second subscription profile; and
    executing the sequence of commands defined by the command script.

* * * * *